(12) United States Patent
Sakata

(10) Patent No.: US 7,338,083 B2
(45) Date of Patent: Mar. 4, 2008

(54) SEAT BELT APPARATUS

(75) Inventor: Yoshiaki Sakata, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 11/519,832

(22) Filed: Sep. 13, 2006

(65) Prior Publication Data

US 2007/0069515 A1 Mar. 29, 2007

(30) Foreign Application Priority Data

Sep. 29, 2005 (JP) .............................. 2005-283332

(51) Int. Cl.
*B60R 22/36* (2006.01)
(52) U.S. Cl. .................................. 280/806
(58) Field of Classification Search ............ 280/801.1, 280/806, 808; 297/468, 480, 482, 483
See application file for complete search history.

(56) References Cited

U.S. PATENT DOCUMENTS 3,659,801 A * 5/1972 Romanzi, Jr. ............... 242/379
3,811,703 A * 5/1974 Turkovich ................... 297/474
7,118,132 B2 * 10/2006 Terasaki ..................... 280/806
2004/0041390 A1 3/2004 Tomita
2004/0212188 A1 10/2004 Terasaki

FOREIGN PATENT DOCUMENTS

| JP | 59-124544 | | 8/1984 |
| JP | 2002219975 A | * | 8/2002 |
| JP | 2005-81885 | | 3/2005 |

* cited by examiner

*Primary Examiner*—Eric Culbreth
*Assistant Examiner*—Robert A. Coker
(74) *Attorney, Agent, or Firm*—Foley & Lardner LLP

(57) ABSTRACT

In a lap anchor section in which a seat belt is inserted to a lap anchor cover so as to be connected to a pretensioner, the seat belt has a rigid portion in which an end of the seat belt is folded over itself in the vicinity of an insertion hole of the lap anchor cover and sewn with sewing thread and bound according to a complex sewing pattern. In addition, a chamfered portion inclined relative to the insertion direction of the seat belt is arranged at an end of the insertion hole of the lap anchor cover.

9 Claims, 6 Drawing Sheets

FIG. 5(b)
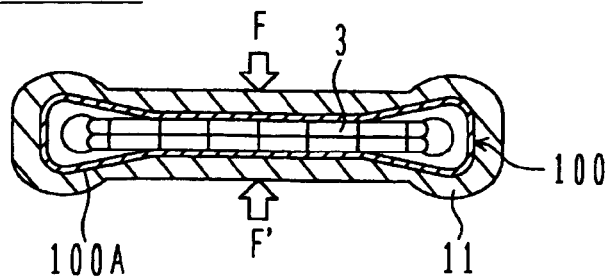
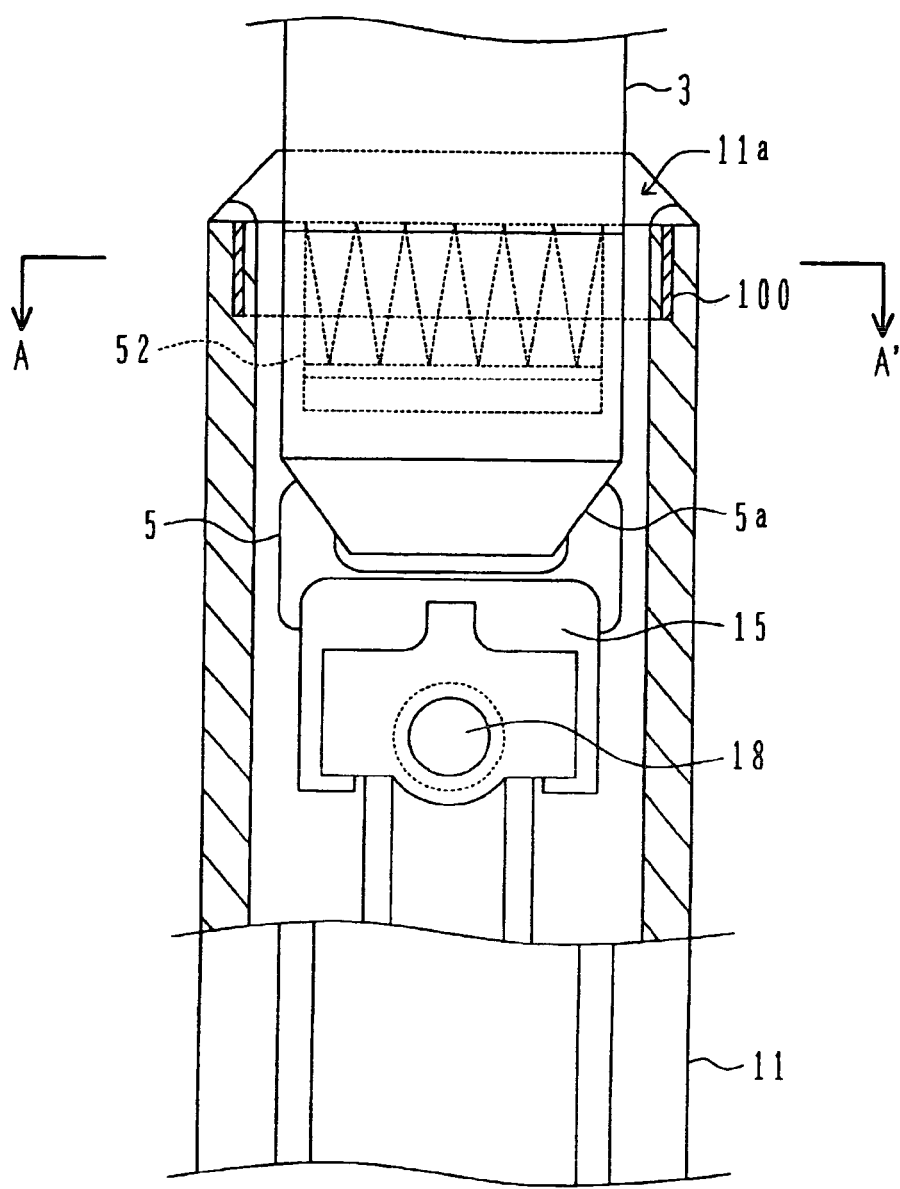
FIG. 5(a)

SEAT BELT APPARATUS

BACKGROUND

The present invention relates to seat belt apparatuses fixed at vehicle seats restraining occupants with seat belts in emergency situations, such as a vehicle collision.

In general, a seat belt apparatus includes: a seat belt retractor fixed to a vehicle body at a portion in the vicinity of a vehicle seat, the seat belt retractor retracting a seat belt while allowing withdrawal or retraction of the seat belt in ordinary situations and restraining an occupant by inhibiting the withdrawal of the seat belt in emergency situations such as a vehicle collision; the seat belt extending from the seat belt retractor with a tip end thereof connected to a lap anchor section, which is, for instance, fixed to the vehicle body at a portion near the outer side of the vehicle seat, for restraining the occupant with the seat belt fastened; a buckle, for example, fixed to the vehicle body at a portion near the inner side of the vehicle seat; and a tongue provided at the seat belt so that the tongue can slide freely along the seat belt and can be engaged with and disengaged from the buckle. When the seat belt is extended across the shoulder, chest and waist of the occupant and the tongue is engaged with the buckle, the seat belt is fastened about the occupant.

With the seat belt fastened, the seat belt is relatively loosely retracted by a seat belt retractor and fits to the occupant while allowing the withdrawal or retraction of the seat belt such that the occupant does not feel too tightly restrained in ordinary situations. Meanwhile, when a large vehicle deceleration occurs in emergency situations, such as a vehicle collision, the force attempting to move the occupant forward due to the inertial force, the seat belt is inhibited from being withdrawn so as to restrain the occupant.

This conventional seat belt apparatus may be provided with a pretensioner for restraining the occupant immediately with a large restraining force according to enhancement on the restraining by eliminating looseness of the seat belt in emergency situations, such as a vehicle collision, and by restraining the seat belt immediately. If such a pretensioner is provided at the lap anchor section, the tip end of the seat belt is connected to the pretensioner through the lap anchor. A lap anchor cover is provided to cover the connection portion. In such a seat belt apparatus, the pretensioner operates to pull the seat belt connected to the lap anchor to eliminate the looseness of the seat belt in emergency situations as described above, thereby immediately restraining the seat belt.

The lap anchor cover guides the lap anchor and the seat belt in the retraction of the seat belt. For example, a configuration is disclosed in Japanese Unexamined Patent Application Publication No. 2004-322739 (which is incorporated by reference herein in its entirety) that a seat belt is sewn with sewing thread and bound to a lap anchor cover in the vicinity of an insertion hole. With this related art, when the seat belt is drawn in, the binding portion sewn with the sewing thread would be broken due to the draw-in force.

SUMMARY

One embodiment of the invention relates to a seat belt apparatus. The apparatus comprising: a seat belt; a retractor for retracting the seat belt; a tongue attached to the seat belt; a seat belt buckle detachably attached to the tongue; a lap anchor with a lap anchor cover to which the seat belt is inserted; and a pretensioner for restraining an occupant with the seat belt by drawing in the lap anchor in emergency situations. The seat belt includes a lap rigid portion in which an end of the seat belt is folded back over itself, the lap rigid portion being positioned in the vicinity of an insertion hole of the lap anchor cover.

Another embodiment of the invention relates to seat belt apparatus. The seat belt apparatus comprises: a seat belt; a retractor for retracting the seat belt; a tongue attached o the seat belt; a seat belt buckle detachably attached to the tongue; a lap anchor with a lap anchor cover in which the seat belt is inserted; and a pretensioner for restraining an occupant with the seat belt by drawing in the lap anchor in emergency situations. The lap anchor cover includes an insertion hole pressing member at an insertion hole for sandwiching both surfaces of the seat belt due to resilient restoring force.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIGS. 5(a) and 5(B) are views showing a modification in which an insertion hole pressing member is provided at the insertion hole. FIG. 5(a) is a front cross-sectional view and FIG. 5(b) is a cross-sectional top view taken along line A-A' in FIG. 5(a).

DETAILED DESCRIPTION

Figure 1:
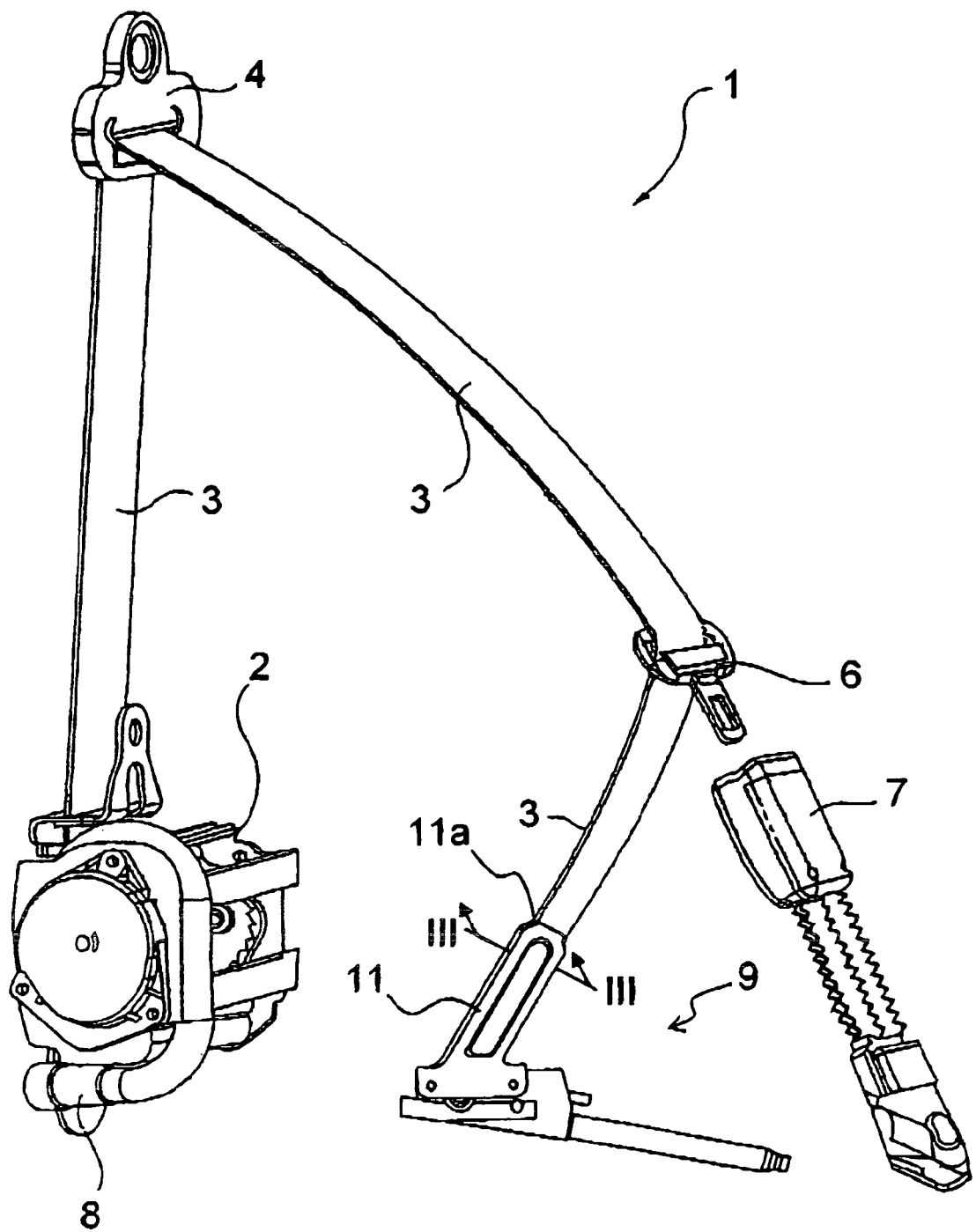
FIG. 1 is a general view showing an exemplary embodiment of a seat belt apparatus according to an embodiment of the present invention.

According to the related art in which the lap anchor cover and the seat belt are sewn and bound to each other, a narrow breaking portion provided between two adjacent openings toward the lap anchor cover is sewn with the sewing thread on the seat belt side to form a binding portion. Depending on a setting of resistance against the break of the binding portion, a non-broken state in ordinary situations and a broken state in emergency situations are switched. Owing to this, a special sewing machine dedicated to sewing the sewn binding portion needs to be prepared. In addition, a sewing needle of the sewing machine should be positioned precisely for reliably sewing the narrow breaking portion. Thus it is difficult to facilitate production control.

An object of the present invention is to provide a seat belt apparatus capable of facilitating production control.

According to a first embodiment of the invention, a seat belt apparatus includes: a seat belt; a retractor for retracting the seat belt; a tongue attached to the seat belt; a seat belt buckle to which the tongue is detachably attached; a lap anchor provided with a lap anchor cover to which the seat belt is inserted; and a pretensioner for restraining an occupant with the seat belt by drawing in the lap anchor in emergency situations. The seat belt includes a lap rigid portion in which an end of the seat belt is folded over itself (sometimes referred to as tucked in and lapped), the lap rigid portion being positioned in the vicinity of an insertion hole of the lap anchor cover.

With this configuration, high rigidity obtained by the lap rigid portion can enhance torsion rigidity of the seat belt in the vicinity of the insertion hole of the lap anchor cover. At this time, only positioning the lap rigid portion in the vicinity of the insertion hole of the lap anchor cover achieves the high torsion rigidity of the seat belt without precisely sewing for binding as in the related art, thereby facilitating the production control.

In addition, in the seat belt apparatus of an embodiment of the present invention, the lap rigid portion may include a sewn binding portion sewn with sewing thread.

With this configuration, the lap rigid portion composed of the end of the seat belt is bound to the seat belt.

In addition, in the seat belt apparatus of an embodiment of the present invention, the lap anchor cover may have a cut shaped portion at an end of the insertion hole.

With this configuration, the cut shaped portion allows a torsion load to widely disperse at the end of the insertion hole, at which the largest torsion load is applied to the seat belt, and can support the seat belt in a flexible manner. In addition, fuzz or fraying due to friction between the lap anchor cover and the seat belt can be reduced.

In addition, in the seat belt apparatus of an embodiment of the present invention, the lap anchor cover may have an insertion hole lid at the insertion hole, the insertion hole lid protruding toward surfaces of the seat belt.

With this configuration, the insertion hole lid enhances the degree of adhesion relative to the seat belt so as to support the seat belt in front-back side direction.

In addition, in the seat belt apparatus of an embodiment of the present invention, the lap anchor cover may have an insertion hole pressing member at the insertion hole for sandwiching both surfaces of the seat belt due to resilient restoring forces.

With this configuration, the insertion hole pressing member sandwiches the seat belt, thereby integrating the seat belt and the lap anchor cover, so that the torsion rigidity of the seat belt in the vicinity of the insertion hole of the lap anchor cover can be enhanced.

In addition, another embodiment of the invention includes: a seat belt; a retractor for retracting the seat belt; a tongue attached to the seat belt; a seat belt buckle to which the tongue is detachably attached; a lap anchor provided with a lap anchor cover in which the seat belt is inserted; and a pretensioner for restraining an occupant with the seat belt by drawing in the lap anchor in emergency situations. The lap anchor cover has an insertion hole pressing member at an insertion hole for sandwiching the both surfaces of the seat belt due to resilient restoring forces.

The insertion hole pressing member sandwiches the seat belt at the insertion hole of the lap anchor cover, thereby integrating the seat belt and the lap anchor cover. Accordingly, the integration can enhance the torsion rigidity of the seat belt in the vicinity of the insertion hole of the lap anchor cover, and consequently, the pretensioner can draw in the seat belt smoothly in emergency situations. At this time, only sandwiching the seat belt with the insertion hole pressing member is required without precisely sewing for the binding as in the related art, thereby facilitating the production control.

According to embodiments of the present invention, the control of production of the seat belt apparatus may be facilitated.

An embodiment of the present invention will be described below with reference to drawings.

FIG. 1 is a general view showing an exemplary embodiment of a seat belt apparatus according to the present invention.

As shown in FIG. 1, a seat belt apparatus 1 of this embodiment includes a seat belt retractor 2 fixed to a floor or the like of a vehicle body; a well-known shoulder anchor 4 attached at a center pillar or the like of the vehicle body for guiding a seat belt 3 extended from the seat belt retractor 2 to be set at a predetermined position with respect to an occupant; a lap anchor section having a lap anchor cover 11 fixed to the floor or the like of the vehicle body, for instance, fixed to the vehicle seat at a portion toward the outer side of the vehicle body, in which a tip end of the seat belt 3 is passed through an insertion hole 11a and is connected at an inside thereof (later-described); a well-known tongue 6 slidably supported at the seat belt 3; and a well-known buckle 7 fixed to the floor or the like of the vehicle body, for instance, fixed to the vehicle seat at a portion toward the inner side of the vehicle body, the tongue 6 capable of being engaged with the buckle 7.

The seat belt retractor 2 is an Emergency Locking Retractor (ELR with a pretensioner) provided with a well-known pretensioner 8. Note that the seat belt retractor 2 is not limited thereto, and any types of well-known seat belt retractors, such as an ELR without the pretensioner 8, an Automatic Locking Retractor (ALR), and a seat belt retractor with an overload limiter for limiting a load applied to the seat belt, and the like may be adopted.

In addition, a lap anchor 5 (see FIG. 2) fixes the tip end of the seat belt 3 at the vehicle body. The lap anchor 5 is provided with an outer lap pretensioner 9 (hereinafter, abbreviated to a pretensioner) for restraining the occupant with the seat belt 3 by drawing in the lap anchor 5 in emergency situations such as a vehicle collision. The lap anchor 5 is fixed to the vehicle body through the pretensioner 9. The pretensioner 9 used in the seat belt apparatus 1 of this embodiment allows high-pressure reactant gas to be generated by reacting a reactant in emergency situations such as a vehicle collision, so that the seat belt 3 is pulled toward the lap anchor 5 due to the reactant gas. The seat belt 3 may extend through a shoulder anchor 4.

Figure 2:
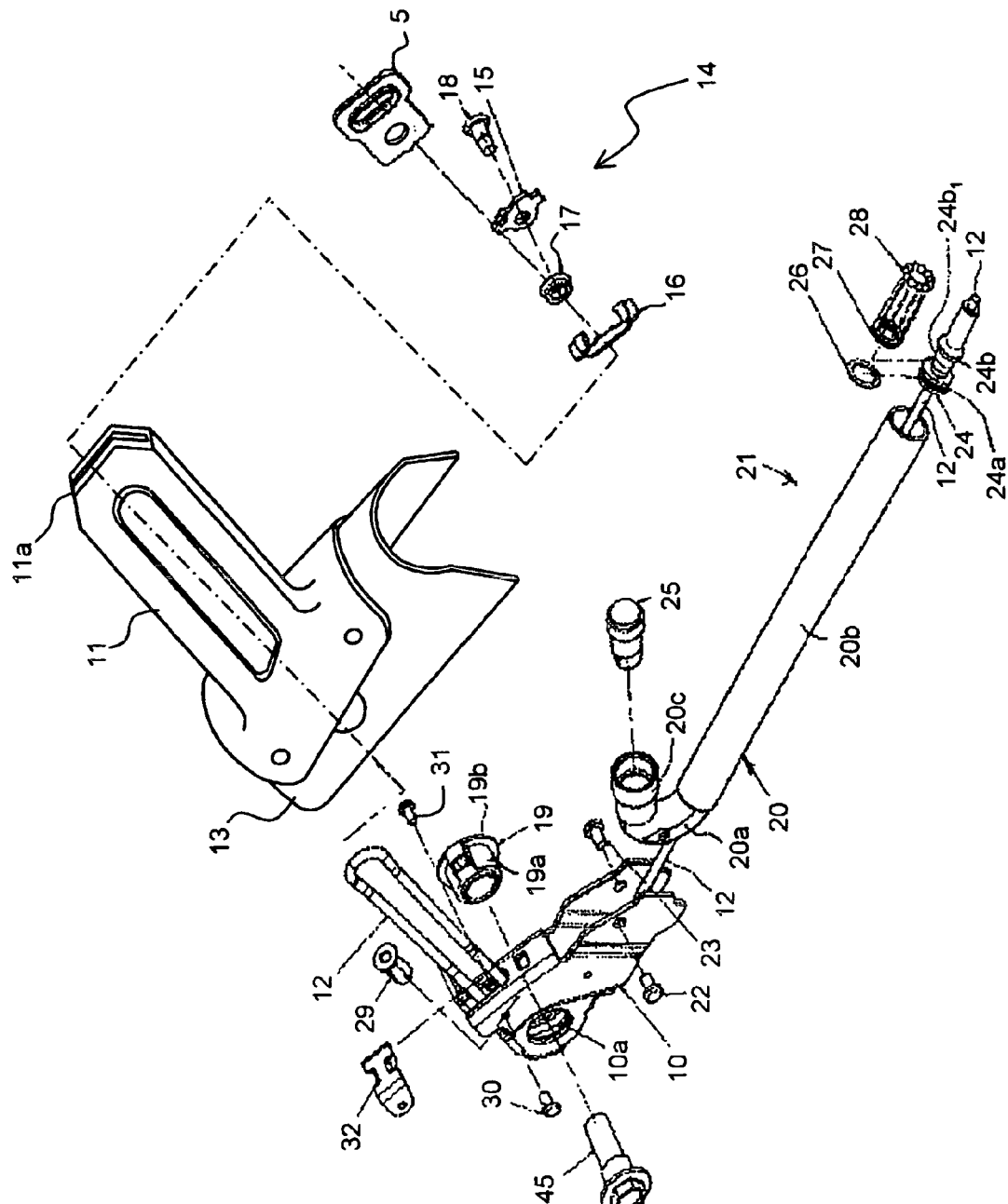
FIG. 2 is an exploded perspective view showing a pretensioner which is used with the seat belt apparatus.

As shown in FIG. 2, with the pretensioner 9 of this embodiment, the lap anchor cover 11 is attached to a bracket 10. The lap anchor cover 11 also has a lower cover 13 attached to a lower portion thereof, the pretensioner 9 being entirely covered with the lap anchor cover 11 and the lower cover 13. The lap anchor cover 11 holds and guides a wire 12. The lap anchor 5 is provided inside the lap anchor cover 11. A wire plate 15 is attached to an end of the lap anchor 5 opposite the insertion hole 11a of the lap anchor cover 11 with use of a wire clip 16. A pulley 17 is supported at the wire plate 15 so as to rotate with use of a rivet 18. The wire 12 is hooked to the pulley 17.

A cylindrical collar 19 is disposed inside the bracket 10. The collar 19 is constituted by a shaft 19a and a flange 19b. In addition, an attachment hole 10a is made at the bracket 10. The attachment hole 10a has a size that allows the shaft 19a of the collar 19 to pass through, but inhibits the flange 19b to pass through. After inserting the shaft 19a of the collar 19 to the attachment hole 10a, the rotating of the collar 19 causes the collar 19 to be fixed to the bracket 10. This fixture mechanism of the collar 19 to the bracket 10 may be adapted as any well-known fixture mechanism as long as a shaft is fixed by inserting the shaft to the hole and then rotating the shaft.

Further, a cylinder 21 composed of a cylindrical pipe 20 made of iron, aluminum or the like is attached to the bracket 10 with a pair of screws 22 and 23. In this case, an attachment section of the pipe 20 to the bracket 10 is defined as a curved portion 20a which is curved at a predetermined angle. The curved portion 20a of the pipe 20 is attached to the bracket 10 with the pair of screws 22 and 23. One linear section of the pipe 20 relative to the curved portion 20a is defined as a piston-sliding portion 20b in which a piston 24 slides, whereas the other linear section of the pipe 20 is defined as a gas generator housing 20c for accommodating a later-described gas generator 25.

In addition, though not shown, a wire through hole is made, for instance, by punching or the like at the curved portion 20a of the pipe 20 coaxially with the central axis of the piston-sliding portion 20b of the cylinder 21 (that is, the central axis of the piston 24). The wire 12 slidably passes through the wire through hole in an airtight manner.

The piston 24 is slidably arranged in the piston-sliding portion 20b of the cylinder 21 in an airtight manner. The piston 24 is constituted by a piston portion 24a and a rod 24b extending from the piston portion 24a. An O-ring 26 is provided at the piston portion 24a for maintaining the airtight state between the piston portion 24a and an inner periphery of the piston-sliding portion 20b. In addition, a ball ring 27 is fitted to the rod 24b and the ball ring 27 supports a certain number of balls 28. In this case, the ball ring 27 and the certain number of balls 28 are located at a position of the rod 24b adjacent to the piston portion 24a.

The certain number of balls 28 abut on an outer periphery $24b_1$ of the rod 24b. The outer periphery 24bis formed to have a curved surface or an inclined surface that increases in diameter in the lower right direction along the axis thereof in FIG. 2. The certain number of balls 28 is located at a position, which is the closest to the piston portion 24a, of the outer periphery $24b_1$ of the rod 24b in ordinary situations. At this time, the respective balls 28 are hardly pressed to the inner periphery of the piston-sliding portion 20b, so that the piston 24 can easily slide in the lower right direction. On the other hand, when the piston 24 slightly moves axially in the upper left direction of the piston-sliding portion 20b, the respective balls 28 move in the lower right direction. Accordingly, the respective balls 28 are highly pressed to the inner periphery of the piston-sliding portion 20b with the outer periphery $24b_1$ having the curved or inclined surface. The pressing of these balls 28 to the inner periphery of the cylinder 21 causes the piston 24 to be engaged with the inner periphery of the piston-sliding portion 20b, thereby inhibiting the movement of the piston 24 in the upper left direction.

As described above, the certain number of balls 28, the outer periphery $24b_1$ of the rod 24b, and the inner periphery of the piston-sliding portion 20b constitutes a one-way clutch, in which the piston-sliding portion 20b and the piston 24 are not engaged with each other when the piston 24 moves in the lower right direction relative to the piston-sliding portion 20b; allowing the piston 24 to move in the lower right direction, whereas the piston-siding portion 20b and the piston 24 are engaged with each other when the piston 24 moves in the upper left direction relative to the piston-sliding portion 20b; inhibiting the piston 24 to move in the upper left direction.

Further, an end of the wire 12 passes through the piston portion 24a and the rod 24b, and connected to an end of the rod 24b opposite to the piston portion 24a. The wire 12 slidably passes through the above-described wire through hole in an airtight manner, which is made at the curved portion 20a of the pipe 20 and extends from the piston 24 in the upper left direction to the outside of the cylinder 21. Then, the wire 12 is bent by the collar 19 attached to the bracket 10 and is changed in direction toward a connector assembly 14 (refer to FIG. 2 and later-described FIG. 3).

Then, the wire 12 changed in direction passes through the lap anchor cover 11, while being guided and held thereby, and extends toward the lap anchor 5. The wire 12 is then hooked to the pulley 17, which is rotatably supported by the lap anchor 5 as described above, passes through the lap anchor cover 11 again, while being guided and held thereby, and then returns to the direction of the bracket 10.

Then the other end of the wire 12, which returns to the direction of the bracket 10, is positioned by and connected to a wire end 29 fixed at the bracket 10. The wire end 29 is fixed to a sub bracket 32 fixed at the bracket 10 with a pair of screws 30 and 31.

Further, the typical gas generator 25 is accommodated and fixed in the gas generator housing 20c. At this time, the gas generator 25 is located at a position deviated from the central axis of the piston 24, so as not to interfere with the wire 12.

Incidentally, in FIG. 2, numerical reference 45 denotes a bolt for attaching the pretensioner 9 to the vehicle body by passing through the attachment hole 10a of the bracket 10 and an inner hole of the collar 19.

When a vehicle undergoes a large deceleration collision or the like with the seat belt 3 fastened such that the seat belt 3 is inserted from the insertion hole 11a and connected to the lap anchor 5 as described below, the gas generator 25 operates to react the reactant for generating the high-pressure reactant gas. The generated gas passes through the curved portion 20a of the pipe 20 and then enters the piston-sliding portion 20b, so that the gas pressure acts on the piston 24. Accordingly, the piston 24 moves obliquely in the lower right direction in FIG. 2 and thus the wire 12 is pulled, so that a draw-in force acts on a connector assembly 14 and the lap anchor 5 toward the bracket 10.

Due to this, the lap anchor 5 is drawn in toward the bracket 10 in the lap anchor cover 11. Hence the seat belt 3 is pulled through the lap anchor 5, so that the occupant is immediately restrained and the restraining force increases. Note that it is obvious that the pretensioner 9 may be adapted as other well-known pretensioners instead of the one using the gas generator 25.

Figure 3:
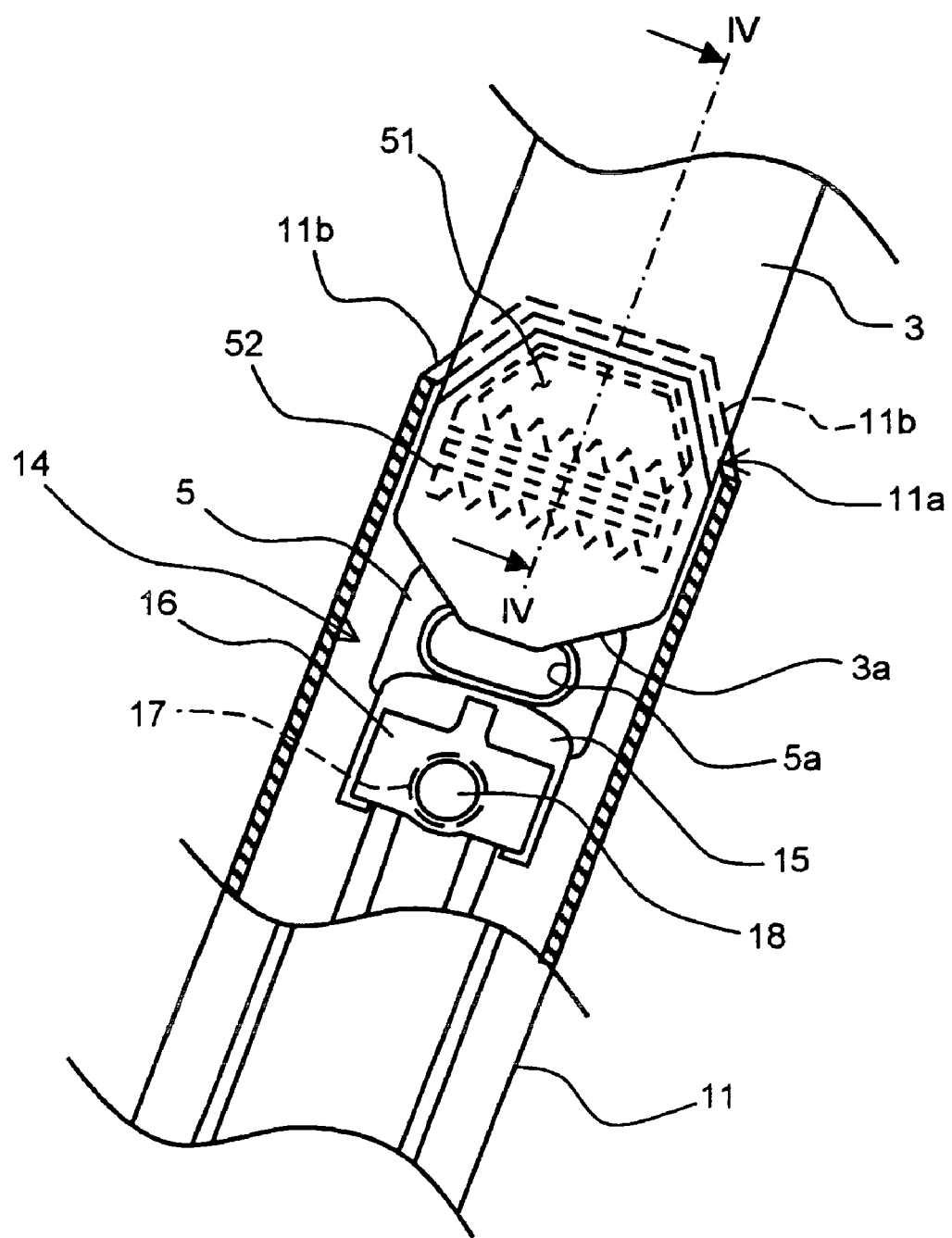
FIG. 3 is a cross sectional view taken along line III-III of FIG. 1 showing the inside of a lap anchor cover.

FIG. 3 is a cross sectional view taken along line III-III of FIG. 1 showing the inside of the lap anchor cover 11. As shown in FIG. 3, the upper part of the lap anchor cover 11 is formed substantially in a hollow rectangular parallelepiped, and the lap anchor 5 to which the wire 12 is hooked through the pulley 17 is provided inside the hollow portion at the lower part thereof. An engagement hole 5a is made at the upper part of the lap anchor 5 (toward the insertion hole 1 a of the lap anchor cover 11). The end of the seat belt 3 inserted from the insertion hole 11a of the lap anchor cover 11 passes through the engagement hole 5a of the lap anchor 5, is folded back at a narrow fold-back portion 3a, and the folded-back end is sewn and bound (dashed line in the drawing) on the surface of the seat belt 3 as the lap rigid portion 51. In ordinary situations as shown in the drawing with the seat belt 3 not drawn in by the pretensioner 9, the lap rigid portion 51 is located in the vicinity of the insertion hole 11a in the lap anchor cover 11, and is rigidly sewn with the sewing thread and bound according to a predetermined sewing pattern (sewn binding portion) 52 that provides flexural rigidity to the belt. For example, a sewing pattern of "dropping a stitch" as shown in FIG. 5 is effective.

Chamfered portions (cut shaped portions) 11b inclined relative to the insertion direction of the seat belt 3 are formed at both ends of the insertion hole 11a of the lap anchor cover 11. The lap rigid portion 51 located inside the lap anchor cover 11 is formed in a profile corresponding to that of the chamfered portions 11b.

Figure 4:
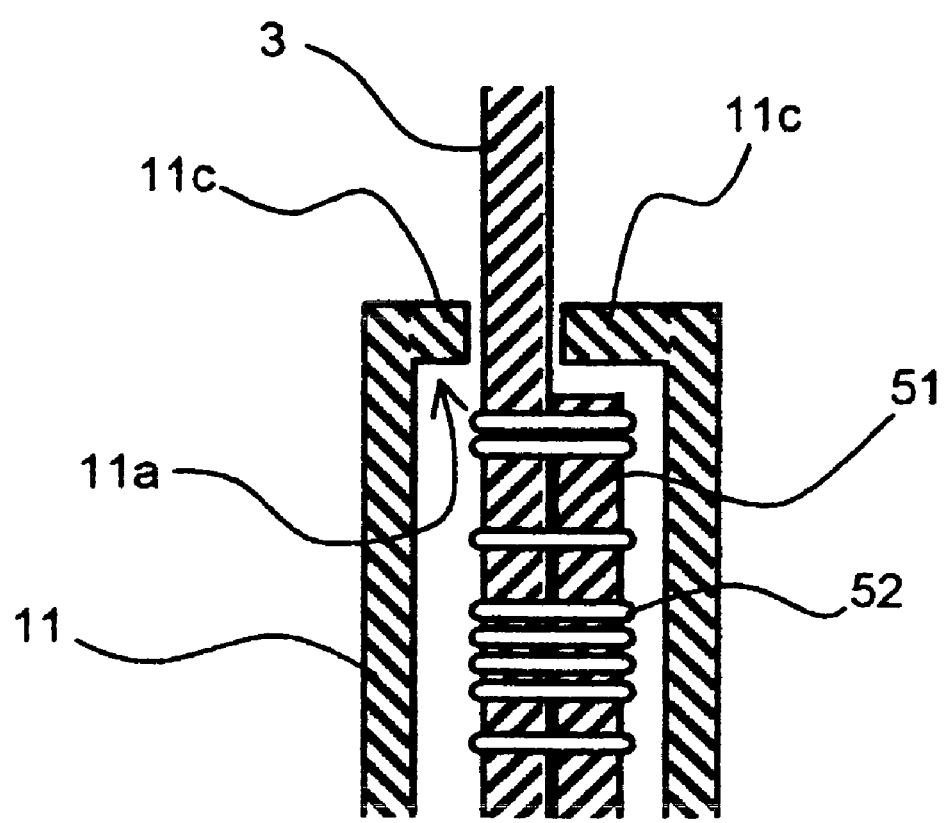
FIG. 4 is a cross sectional view taken along line IV-IV of FIG. 3 showing the lap anchor cover and a seat belt in the vicinity of an insertion hole.

FIG. 4 is a cross sectional view taken along line IV-IV of FIG. 3 showing the lap anchor cover 11 and the seat belt 3 in the vicinity of the insertion hole 11a. As shown in FIG. 4, an insertion hole lid 11c is formed at the insertion hole 11a of the lap anchor cover 11 to protrude toward the surfaces of the seat belt 3 (in this embodiment shown in the drawing, both front and back surfaces), so that a space for permitting the lap rigid portion 51 and the lap anchor 5 to be drawn in to the lap anchor cover 11 is secured, and since the insertion hole lid 11c shuts the inner space from the outside of the lap anchor cover 11, dust and such can be prevented from entering thereto.

Basically, the seat belt 3 is only engaged with the lap anchor 5, so that the seat belt 3 can move relatively with respect to the lap anchor cover 11 in the width direction of the seat belt 3 due to a small gap between the seat belt 3 and both ends of the insertion hole 11a while having freedom to move in the longitudinal direction of the seat belt webbing.

According to the seat belt apparatus 1 with the above-described configuration, the lap rigid portion 51 can enhance the torsion rigidity of the seat belt 3 in the vicinity of the insertion hole 11a of the lap anchor cover 11, while the pretensioner 9 can draw in the seat belt 3 smoothly in emergency situations. In addition, only positioning the lap rigid portion 51 in the vicinity of the insertion hole 11a of the lap anchor cover 11 achieves the high torsion rigidity of the seat belt 3 without the need to employ precise sewing to bind the webbing as in the conventional configuration, thereby facilitating production control. In addition, since the lap rigid portion 51 can be provided with a simple manufacturing method, it is extremely advantageous for reducing man-hours and the cost manufacturing. Further, the twisting-reducing performance of the seat belt 3 can be maintained without being affected by the load applied to the seat belt 3 and the external force applied to the lap anchor cover 11 in ordinary situations.

In addition, since the lap rigid portion 51 composed of the end of the seat belt 3 has the sewn binding portion (sewing pattern 52) sewn with the sewing thread, the lap rigid portion 51 can be bound to the seat belt 3, thereby providing a certain torsion rigidity. Alternatively, other than such sewn binding portion, the seat belt 3 and the lap rigid portion 51 may be bounded to each other according to other method such as binding with a proper binding with a fastener, heat welding, needle clamp by bonding with an adhesion, or the like.

In addition, since the chamfered portions 11b inclined relative to the insertion direction of the seat belt 3 are formed at the ends of the insertion hole 11a of the lap anchor cover 11, the chamfered portions 11b allow a torsion load to widely disperse at the end of the insertion hole 11a, at which the largest torsion load is applied to the seat belt 3, so as to support the seat belt 3 in a flexible manner, thereby reducing the twisting of the seat belt 3.

In addition, since the insertion hole lid 11c is formed to protrude toward the surfaces of the seat belt 3 at the insertion hole 11a of the lap anchor cover 11, the rigidity of the hollow lap anchor cover 11 itself can be enhanced, and the degree of adhesion of the insertion hole lid 11c relative to the seat belt 3 can be enhanced to support both front and back surfaces of the seat belt 3, thereby reducing the twisting of the seat belt 3.

Alternatively, an insertion hole pressing member for sandwiching both surfaces of the seat belt 3 due to the resilient restoring force may be provided at the insertion hole 11a instead of the insertion hole lid 11c (or in addition to the lid 11c). FIGS. 5(a) and 5(b) show this modification. In FIGS. 5(a) and 5(b), for instance, an insertion hole pressing member 100 is so formed that both ends of strip sheet metal plates 100A extending in the width direction of the seat belt 3 are connected to each other with hinges (not shown) to be a hairpin form in plan view, and are insert molded in the vicinity of the insertion hole 11a of the lap anchor cover 11. The seat belt 3 is inserted to the space between the sheet metal plates 100A. In addition, the sheet metal plates 100A curve to bulge at the center portion thereof in the width direction of the seat belt 3 toward the surfaces of the seat belt 3, so that the resilient restoring force (arrows F and F' in the drawing) of the sheet metal plates 100A constantly acts to press both surfaces of the seat belt 3 with the seat belt 3 sandwiched between the sheet metal plates 100A.

When the insertion hole pressing member 100 with such a configuration is provided, the seat belt 3 is pressed flexibly in front-back side direction to be closely attached, so as to shut the inner space from the outside of the lap anchor cover 11, thereby preventing dusts or the like from entering thereto and supporting the seat belt 3 to reduce the twisting thereof.

Figure 6:
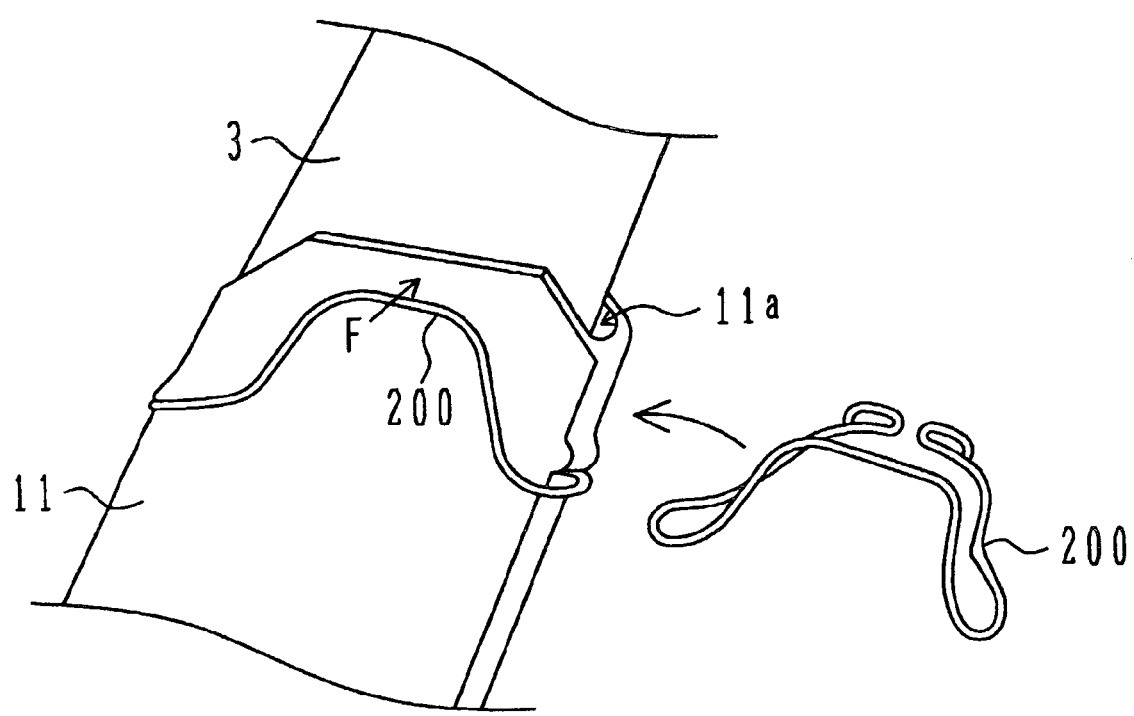
FIG. 6 is a perspective view showing a modification in which a ring shaped spring is provided at the insertion hole.

The above-described specific configuration of the present embodiment does not strictly limit the details of the present invention. For example, as shown in FIG. 6, a ring shaped spring 200 may be provided in the vicinity of the insertion hole 11a of the lap outer cover 11 to press both surfaces of the seat belt 3. Besides, it is obvious that the specific configuration may be modified variously within the scope of the present invention.

Priority Application 2005-283332, filed Sep. 29, 2005 including the specification, drawings, claims and abstract, is incorporated herein by reference in its entirety Given the disclosure of the present invention, one versed in the art would appreciate that there may be other embodiments and modifications within the scope and spirit of the invention. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A seat belt apparatus, comprising:
a seat belt including a lap portion;
a retractor for retracting the seat belt;
a tongue attached to the seat belt;
a seat belt buckle detachably attached to the tongue;
an anchor for anchoring the lap portion of the seat belt;
a cover for the lap anchor; wherein the cover includes an insertion hole into which the seat belt is inserted; and
a pretensioner for restraining an occupant in emergency situations by drawing in the lap anchor, wherein the lap anchor cover includes an insertion hole pressing member located at the insertion hole for applying resilient restoring force to both sides of the seat belt, and wherein the insertion hole pressing member comprises metal plates extending in a width direction of the seat belt, the metal plates connected to each other with a hinge.

2. The seat belt apparatus according to claim 1, wherein the lap portion of the seat belt includes a rigid portion.

3. The seat belt apparatus according to claim 2, wherein the rigid portion includes a binding portion sewn with sewing thread.

4. The seat belt apparatus according to claim 1, wherein the cover includes at least one cut shaped portion at an end of the insertion hole.

5. The seat belt apparatus according to claim 4, wherein the cut shaped portion comprises a chamfered portion inclined relative to an insertion direction of the seat belt, and wherein cut shaped portions are formed at both ends of the insertion hole in the lap anchor cover.

6. The seat belt apparatus according to claim 1, wherein the insertion hole pressing member has hairpin shaped ends.

7. The seat belt apparatus according to claim 1, wherein the metal plates bulge at a center portion such that a resilient restoring force of the metal plates constantly acts to press on both surfaces of the seat belt.

8. The seat belt apparatus according to claim 1, further comprising a ring shaped spring attached to the lap anchor cover.

9. The seat belt apparatus according to claim 8, wherein the ring shaped spring is configured to press both surfaces of the seat belt via the lap anchor cover.

* * * * *